J. E. JOHNSON 1,609,088

SPEED REGULATOR

Filed Oct. 1. 1925

Nov. 30, 1926.  
J. E. JOHNSON  
SPEED REGULATOR  
Filed Oct. 1, 1925  
1,609,088  
7 Sheets-Sheet 7

Inventor  
Joseph Edward Johnson  
by Seymour & Earle  
attys

Patented Nov. 30, 1926.

1,609,088

UNITED STATES PATENT OFFICE.

JOSEPH EDWARD JOHNSON, OF MERIDEN, CONNECTICUT.

SPEED REGULATOR.

Application filed October 1, 1925. Serial No. 59,777.

This invention relates to an improvement in speed regulators for controlling the opening and closing movements of water-wheel gates operated by mechanism under the control of a centrifugal governor, the object of the invention being to provide comparatively simple and reliable means for preventing a too marked movement of a water-wheel gate in either direction at any one time, and to make the shifting movements by a step-by-step operation, whereby excessive movement in one direction or the other is avoided, and the invention consists in the construction and arrangement of parts as hereinafter described and particularly recited in the claims.

In carrying out my invention, I employ a drive-shaft 15, driven through a pulley 16 from the source of power which the regulator is to control. Fixed on the shaft 15, within a housing 17, is a miter-gear 18 constantly moving with the pulley 16. This miter-gear 18 meshes with a gate-closing miter-gear 19 and a gate-opening miter-gear 20 loosely mounted on a gate-operating shaft 21. The gears 19 and 20 are formed respectively with clutch-recesses 22 and 23, in each of which is a clutch mechanism, comprising a pair of segmental shoes 24 and 25, pivotally mounted at one end on a fixed stud 26 and at the opposite end connected by toggles 27 and 28 with a head 29 of an operating-shaft 30, to which is keyed an operating-lever 31 provided at its outer end with a roller 32, these rollers 32 respectively riding in cam-slots 33 and 34 formed in opposite faces of a clutch-operating gear 35 loosely mounted on the shaft 21. The two members of the clutch are connected together by springs 36, which tend to draw them out of engagement with the gate-closing and gate-opening gears. The studs 26 and shafts 30 of each clutch mechanism are respectively mounted in heads 37 and 38, respectively keyed to the shaft 21 by movable keys 39 and 40, and the heads are coupled together by transverse pins 41 and 42, which extend through clearance-slots 43 and 44 in the clutch-operating gear 35, thereby permitting the gear 35 to have a slight relative movement with respect to the heads. The clutch-operating gear 35 meshes with a pinion 45 secured to a shaft 46, to which is also secured a miter-gear 47 meshing with a miter-gear 48 mounted on a cone-clutch shaft 49, which is hexed. as at 50, to cause the gear 48 to turn the shaft 46 so as to couple them for rotation, yet permitting the shaft 49 a certain degree of longitudinal movement. Fixed to the shaft 49 are reversely-arranged inner cone-clutch members 51 and 52, respectively engaging an upper or gate-closing clutch-member 53 and a lower or gate-opening clutch-member 54, being normally out of frictional engagement with both. The gate-closing clutch-member 53 is formed with an integral miter-gear 55 meshing with a gear 56 mounted on a shaft 57 and secured in bearings in the case, and carrying a spur-gear 58 meshing with a gear 59 formed integral with the miter-gear 19, with the result that the outer cone-member is constantly driven in one direction. The clutch-member 54 is provided with an integral gear 60 meshing with a gear 61 on a shaft 62 supported in the casing, and carrying a pinion 63 meshing with a spur-gear 64 formed integral with or rigidly connected to the miter-gear 20, so that the clutch-member 54 is constantly driven in the direction reverse to the clutch-member 53. The inner clutch-members are maintained in a neutral position and slightly out of engagement with their complementary parts by springs 65 and 66. The shaft 49 extends up through a supplemental housing 67, which forms a mount for a governor-frame 68 of a standard centrifugal governor-head 68ª, and having a vertically-movable governor-spindle 69 in line with the shaft 49, so as to move that shaft up or down as the speed increases or diminishes. The governor-head is driven through the usual bevel-gear 70 meshing with a bevel-gear 71 on a horizontal shaft 72 carrying a sprocket 73 connected by a chain 74 with a sprocket 75 mounted on a shaft 76 carrying a gear 77 meshing through an intermediate-gear 78 with the gear 64, by which the governor is constantly driven.

The shaft 21 is connected with the gate-lifting and lowering mechanism by any suitable means, not shown. When the gate is open for the admission of water to produce power, the pulley 16 is revolved, and with it the miter-gear 18 and the gate-closing miter-gear 19 and the gate-opening miter-gear 20. Should the speed of the turbine increase for any reason, as, for instance, by decrease in load or increase in head of water, the centrifugal governor will operate to depress the shaft 49, forcing the inner cone 51 into close engagement with the clutch-member 53, thus causing the shaft 49 to rotate in one direction and, through the gears 48, 47 and 45, turn the clutch-control gear 35, causing the arm 31 to rock, so as to force the clutch-shoes 24 and 25 into engagement with the clutch-recess 22 in the gate-closing gear 19. This action of the clutch-members couples the heads 37 and 38 therewith, and hence turns the shaft 21 in a direction to close the gate.

It may here be mentioned that the ratio between the gears 58 and 59 is as 4:1, while the ratio between the pinion 45 and gear 35 is as 5:1, so that the engagement of the clutch-members 51 and 53 immediately starts the rotation of the clutch-gear 35, so as to throw in the clutch-shoes into connection with the gear 19, as described, and cause the heads 37 and 38 to rotate at the same speed with the gear 19, which is at a slightly greater speed than the speed at which the clutch-control gear 35 is driven by the pinion 45. This results in a momentary release of the clutch-shoes and causes the heads to slow up. As soon as they have slowed up below the speed at which the clutch-gear 35 is being moved, the clutch-shoes will again be thrown into engagement with the gear 19, so as to again rotate the shaft to further close the gate, and it will continue to let go and grip until the gate has been closed sufficiently to produce the normal speed.

On the other hand, should the turbine slow up, due to lack of water or increase in load, the governor will permit the shaft 49 to rise, bringing the clutch-cone 52 into engagement with the clutch-cone 54, which, as before stated, is operated in the direction reverse to the cone 53. This causes the gear 35 to be moved in the opposite direction to bring the other clutch into engagement with the opening-gear 20, and thus drive the gate-operating shaft in the opposite direction, and, owing to the differentiation in the gears, as before described, the same step-by-step operation of the clutch with the gear 20 will take place. In other words, instead of opening and closing the gate to a marked degree, it will feel its way, so to speak, so as to gradually open or close the gate, until the normal speed is attained.

Should it be desired to manually operate the gate by means of a hand-wheel 79 fixed to the shaft 21, the keys 39 and 40 may be moved out of the key-slots 80 of the heads 37 and 38, so as to come into line with clearance-chambers 81 and 82 in the heads 37 and 38, and this may be done by means of a push-rod 83 extending through the center of the shaft 21 for operation by a cam-lever 84. Between the keys is a rod 85, and beyond the key 39 is a short rod 86 bearing against a spring 87, which normally tends to hold the keys in engagement with the key-slots in the heads 37 and 38.

To provide for limiting the maximum movement of the shaft in either direction, the shaft is provided with a worm 88 which meshes with a worm-wheel 89 mounted on a short shaft 90, coupled by a universal joint 91 with a shaft 92, connected by a universal joint 93 with a short shaft 94 carrying a pinion 95 meshing with rack-teeth 96 on a vertically-arranged slide 97 provided with two adjustable dogs 98 and 99 spaced on opposite sides of a handle 100, which is pivoted at 101 to the governor-frame and provided with a forked inner end 102, which engages with a spool 103 mounted on the upper end of the shaft 49.

It may here be stated that the centrifugal governor is provided with the usual torsion spring 104, which acts through the handle 100 to normally tend to lift the shaft 49 against the pressure of the governor-spindle 69. If the shaft 21 makes a predetermined number of revolutions in one direction, it will lift the shaft 49 to move the cone 51 out of the cone 53, so that further movement of the governor-shaft in that direction will be prevented. On the other hand, if the shaft makes a predetermined number of revolutions in the opposite direction, the shaft 49 will be depressed, so as to disengage the cone 52 from the cone 54, thus arresting the movement of the shaft in that direction, it then being free to move in the opposite direction.

Figure 1:
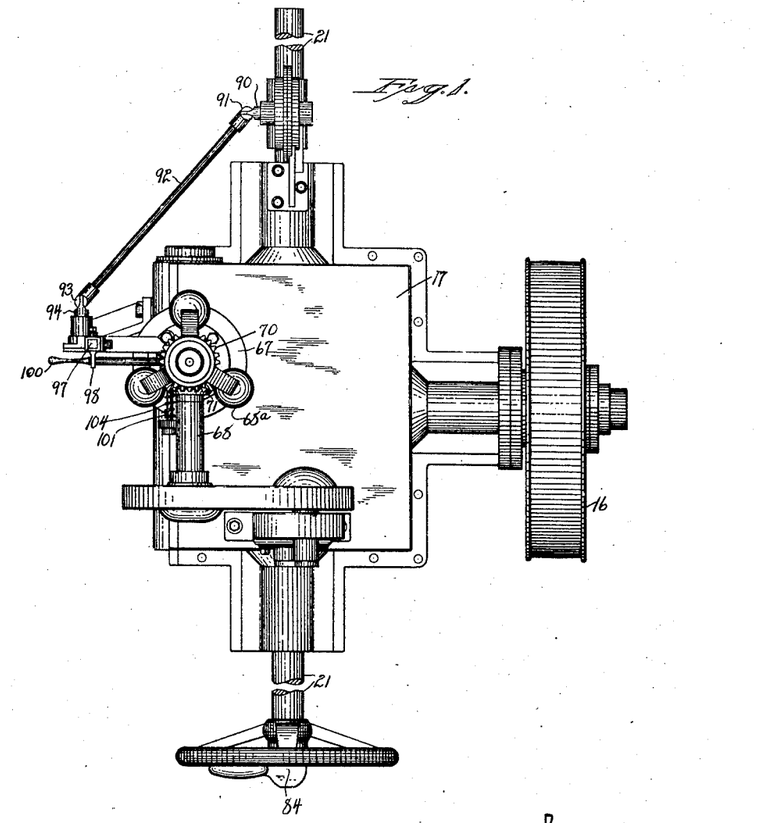
Fig. 1 is a top or plan view of the speed regulator constructed in accordance with my invention.
Figure 2:
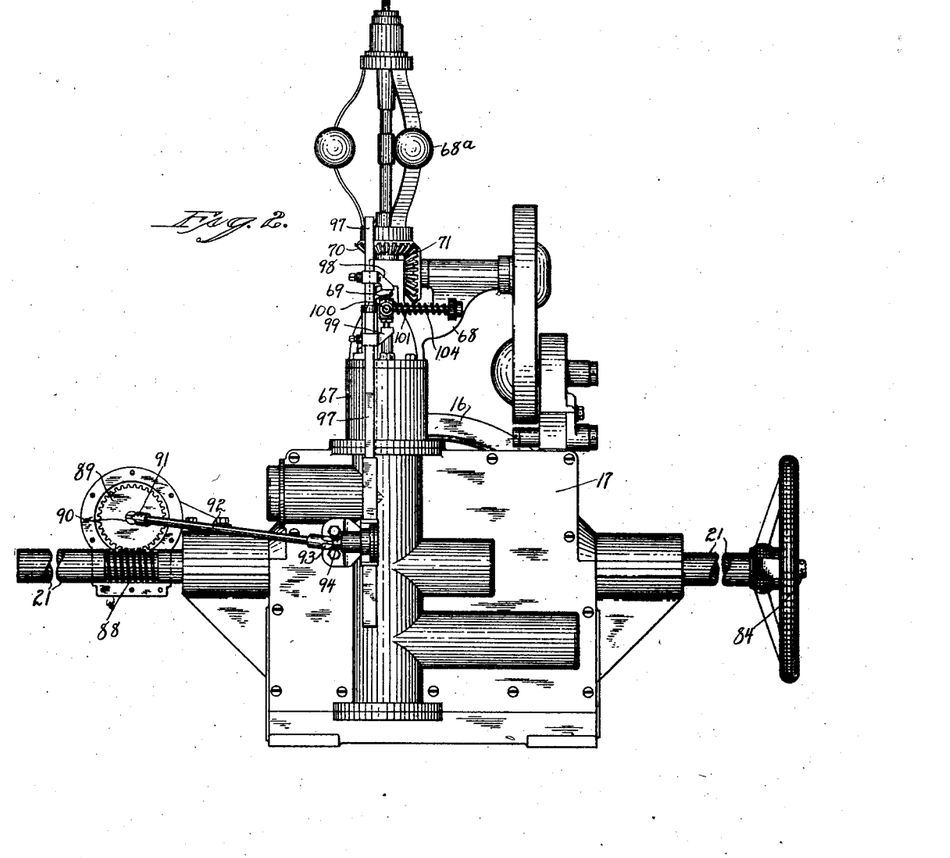
Fig. 2 is a side view of the same.
Figure 3:
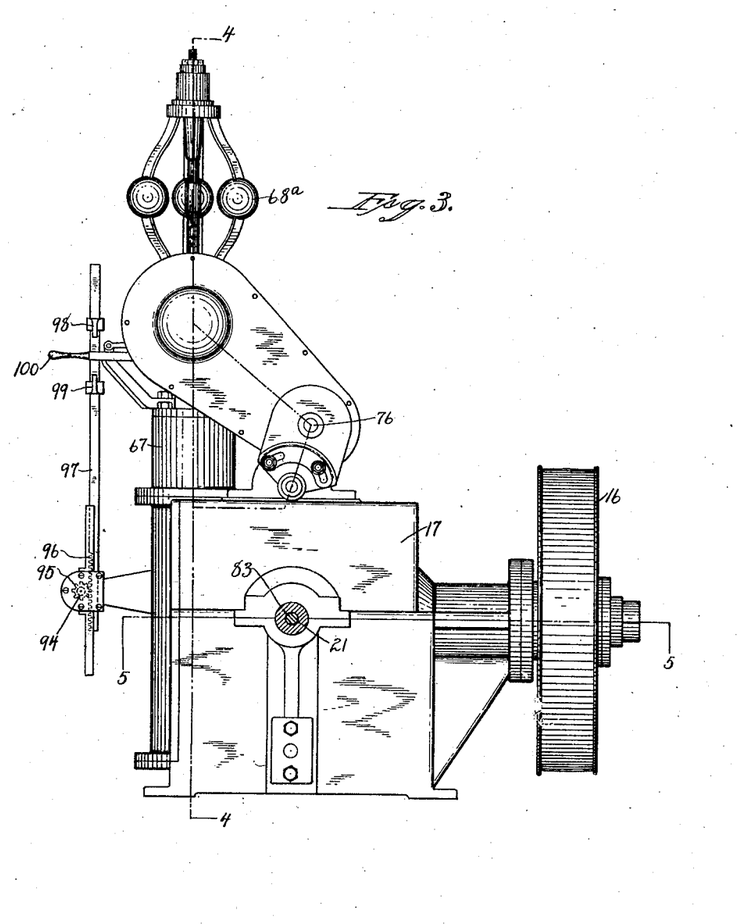
Fig. 3 is an end view with the gate-shaft operating-wheel removed.
Figure 4:
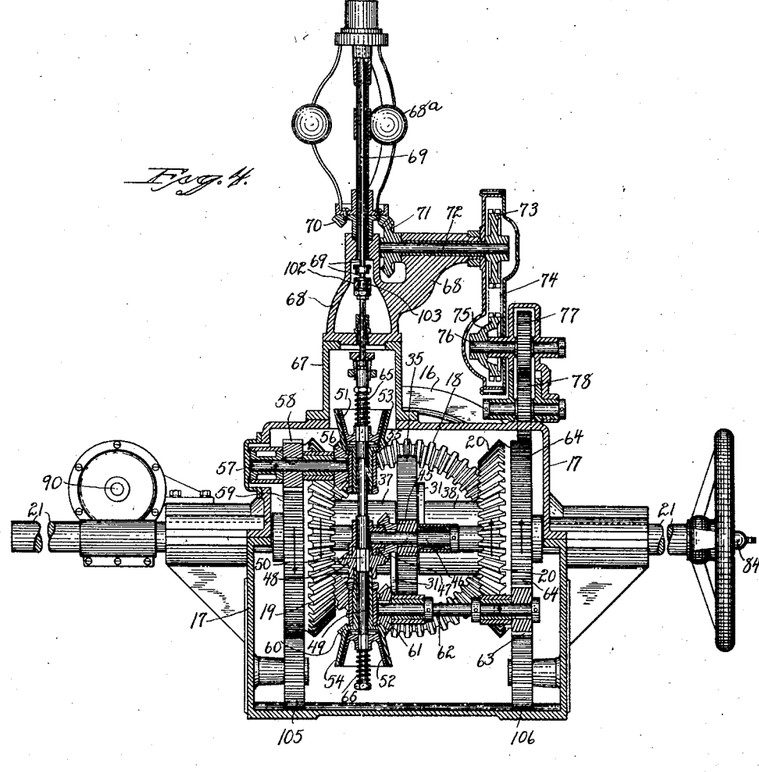
Fig. 4 is a sectional view on the line 4—4 of Fig. 3.
Figure 5:
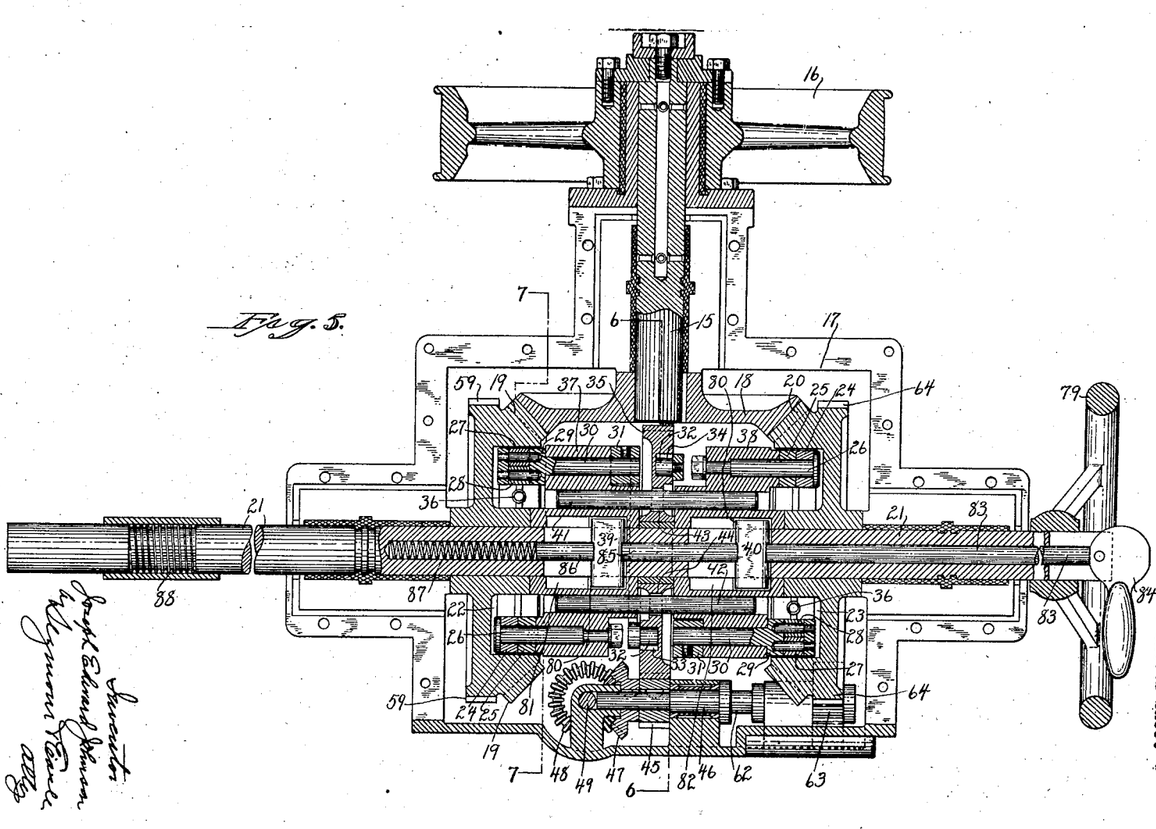
Fig. 5 is a sectional view on the line 5—5 of Fig. 3, on a larger scale.
Figures 6, 9:
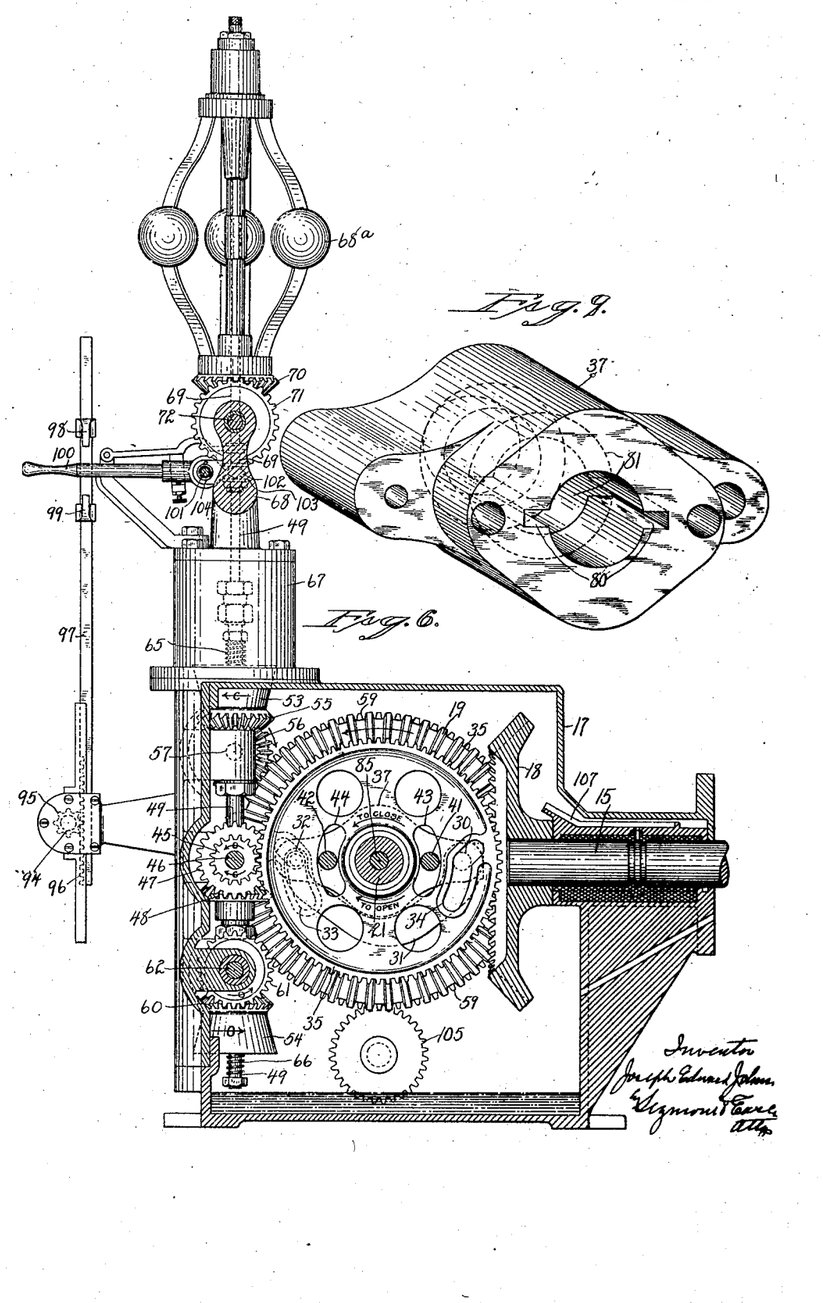
Fig. 6 is a sectional view on the line 6—6 of Fig. 5.
Fig. 9 is a perspective view of one of the clutch-carrying members.
Figure 7:
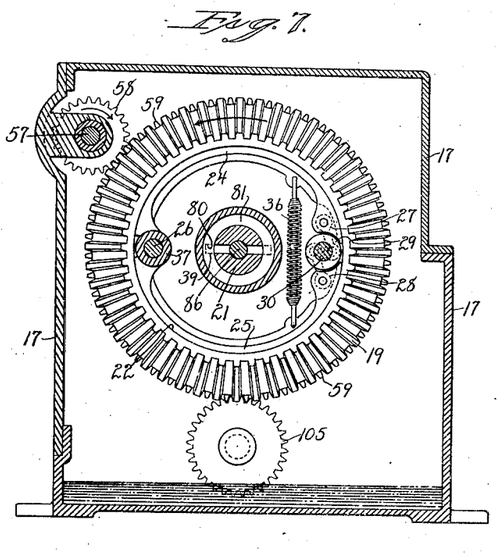
Fig. 7 is a sectional view on the line 7—7 of Fig. 5.
Figure 8:
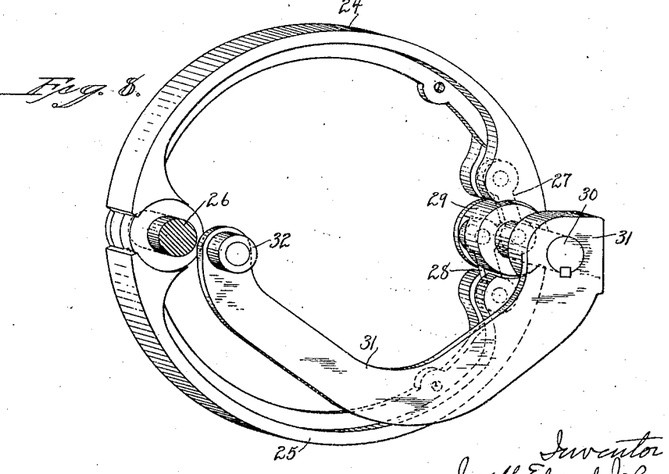
Fig. 8 is a perspective view of one of the geared clutches and its operating-lever, detached.

To keep the mechanism lubricated, I preferably provide gears 105 and 106 mounted in the casing below and in mesh with the gears 59 and 64, and these lower gears run in a pool of oil in the bottom of the casing. From these gears 105 and 106, oil is carried by the gears 59 and 6 and from them splashed over the entire mechanism enclosed in the casing and led to bearings, for instance, by a trough 107, as shown in Fig. 6 of the drawings, to the shaft bearings.

I claim:

1. In a speed regulator for water-wheels, the combination with the driving and driven members thereof, of two reversely-rotating members driven by the said driving-member, coupling-means for connecting the said reversely-rotating members to the said driven-member, a rotary actuating member for the said coupling-means, a centrifugal governor, means controlled by the said centrifugal governor for reversely rotating the said rotary actuating member at a slower rate of speed than the speed of the two reversely-rotating members, whereby the said driven-member is given intermittent impulses by the said driving-member.

2. In a speed regulator for water-wheels, the combination with a water-gate shaft, of two reversely-rotating clutch-engaging gears on said shaft, a driving-gear turning said clutch-engaging gears in opposite directions, a clutch-mechanism for connecting each of the said clutch-engaging gears with the said shaft, a cam-gear driven at a different rate of speed from the clutch-gears, a centrifugal governor normally controlling said clutch-mechanism and acting through the intermediary of the said cam-gear for coupling one or the other of said clutch-engaging gears with the gate-shaft and means moved by the driving-member for intermittently releasing the said clutch-mechanisms, whereby intermittent impulses are imparted to the water-gate shaft.

3. In a speed regulator for water-wheels, the combination with a water-gate shaft, of two reversely-rotating clutch-engaging gears on said shaft, a driving-gear turning said clutch-engaging gears in opposite directions, a clutch-mechanism for connecting each of the said clutch-engaging gears with the said shaft, a cam-gear driven at a different rate of speed from the clutch-gears and connected to said clutch-mechanism for the operation thereof, a centrifugal governor, a shaft moved thereby, said shaft carrying reversely-arranged cone-clutch members adapted to alternately engage with reversely-driven, complementary cone-clutch members, connections between said cone-clutch shaft and said cam-gear for operating the clutch-mechanism to connect one or the other of the said clutch-engaging gears with the shaft.

4. In a speed regulator for water-wheels, the combination with a water-gate shaft, of two reversely-rotating clutch-engaging gears on said shaft, a driving-gear turning said clutch-engaging gears in opposite directions, a clutch-mechanism for connecting each of the said clutch-engaging gears with the said shaft, a cam-gear driven at a different rate of speed from the clutch-gears and connected to said clutch-mechanism for the operation thereof, a centrifugal governor, a shaft moved thereby, said shaft carrying reversely-arranged cone-clutch members adapted to alternately engage with reversely-driven, complementary cone-clutch members, connections between said cone-clutch shaft and said cam-gear for driving said cam-gear, whereby the clutch-engaging gears are intermittently-engaged and disengaged from the shaft.

5. In a speed regulator for water-wheels, the combination with a water-gate shaft, of two reversely-rotating clutch-engaging gears on said shaft, a driving-gear turning said clutch-engaging gears in opposite directions, a clutch-mechanism for connecting each of the said clutch-engaging gears with the said shaft, a cam-gear driven at a different rate of speed from the clutch-gears and connected to said clutch-mechanism for the operation thereof, a centrifugal governor, a shaft moved thereby, said shaft carrying reversely-arranged cone-clutch members adapted to alternately engage with reversely-driven, complementary cone-clutch members, connections between said cone-clutch shaft and said cam-gear for driving the said cam-gear, whereby the clutches are intermittently-engaged and disengaged from the shaft, and means operated by the gate-operating shaft for positively raising or lowering the cone-clutch shaft when the shaft has made the predetermined number of revolutions in either direction.

6. In a speed regulator for water-wheels, the combination with a water-gate shaft, of two reversely-rotating clutch-engaging gears on said shaft, a driving-gear turning said clutch-engaging gears in opposite directions, a clutch-mechanism for connecting each of the said clutch-engaging gears with the said shaft, a cam-gear driven at a different rate of speed from the clutch-gears and connected to said clutch-mechanism for the operation thereof, mountings for the clutch mechanisms having key-ways and clearance-chambers, keys connecting the mountings with the water-gate shaft, means for shifting the keys from the key-ways into line with the clearance-chambers, and a centrifugal governor acting through the said cam-gear for coupling one or the other of said clutch-engaging gears with the gate-shaft.

7. In a speed regulator for water-wheels, the combination with a water-gate shaft, of two reversely-rotating clutch-engaging gears on said shaft, a driving-gear turning said clutch-engaging gears in opposite directions, a clutch-mechanism for connecting each of the said clutch-engaging gears with the said shaft, a cam-gear driven at a different rate of speed from the clutch-gears and connected to said clutch-mechanisms for the operation thereof, mountings for the clutch mechanisms having key-ways and clearance-chambers, keys connecting the mountings with the water-gate shaft, means operated through the axis of the water-gate shaft for shifting the keys from the key-ways into line with the clearance-chambers, and a centrifugal governor acting through the said cam-gear for coupling one or the other of said clutch-engaging gears with the gate-shaft.

8. In a speed regulator for water-wheels, the combination with a water-gate shaft, of two reversely-rotating members, driving means for turning said members in opposite directions, coupling means for connecting either of said members with said shaft, a centrifugal governor for normally controlling the coupling of the members with the shaft, means moved by the driving-member for intermittently releasing the said coupling-means, and means operated by the water-gate shaft for opposing the action of the centrifugal governor when the shaft has been turned to a predetermined degree in either direction.

In testimony whereof, I have signed this specification.

JOSEPH EDWARD JOHNSON.